United States Patent [19]
McCarthy

[11] 3,886,827
[45] June 3, 1975

[54] BREAD SLICING MACHINE

[75] Inventor: Thomas Joseph McCarthy, Richmond, Va.

[73] Assignee: AMF Incorporated, White Plains, N.Y.

[22] Filed: Feb. 14, 1974

[21] Appl. No.: 442,531

[30] Foreign Application Priority Data

Feb. 15, 1973 United Kingdom............... 7603/73

[52] U.S. Cl. .................. 83/56; 83/404.4; 83/407; 83/425.3; 83/431; 83/435.2; 83/751; 83/808
[51] Int. Cl............................ B26d 1/46; B26d 4/02
[58] Field of Search ......... 83/56, 404.4, 407, 425.2, 83/425.3, 431, 435.2, 751, 788, 792, 803, 807, 808

[56] References Cited
UNITED STATES PATENTS

| | | | |
|---|---|---|---|
| 1,993,466 | 3/1935 | Van Berkel | 83/407 X |
| 2,000,816 | 5/1935 | Bettendorf et al. | 83/751 X |
| 2,293,083 | 8/1942 | Schlemmer | 83/435.2 |
| 2,755,856 | 7/1956 | Clemens | 83/404.4 |
| 3,807,266 | 4/1974 | Camp | 83/404.4 |

Primary Examiner—Willie G. Abercrombie
Attorney, Agent, or Firm—George W. Price; Martin Smolowitz

[57] ABSTRACT

A bread slicing machine employing a plurality of cutting knives disposed upon two oppositely moving cooperating V-shaped frames. The width of one blade overlaps the corresponding width of an adjacent blade an amount equal to 20-80 percent of the width and the V opening formed being of 10° to 30°. The bread being sliced is conveyed into the cutting blades at an angle thereto, so as to minimize any gluten build-up and poor cutting action. The aforementioned principle can be applied to endless blades carried by drums.

6 Claims, 16 Drawing Figures

FIG. 1
FIG. 2
FIG. 3
FIG. 4
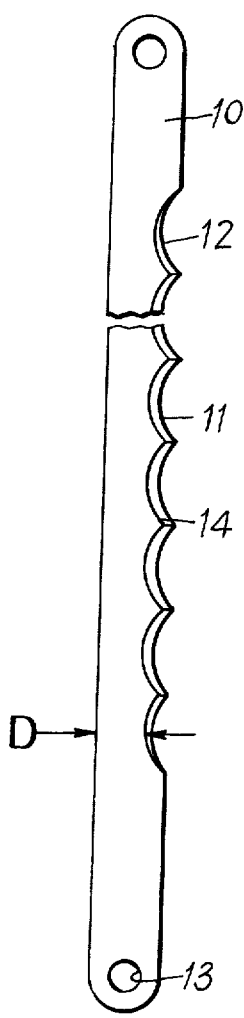
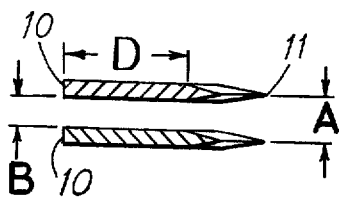
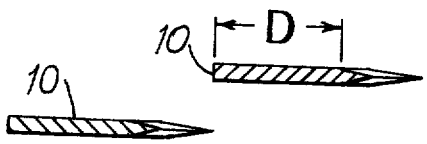
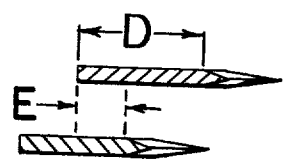

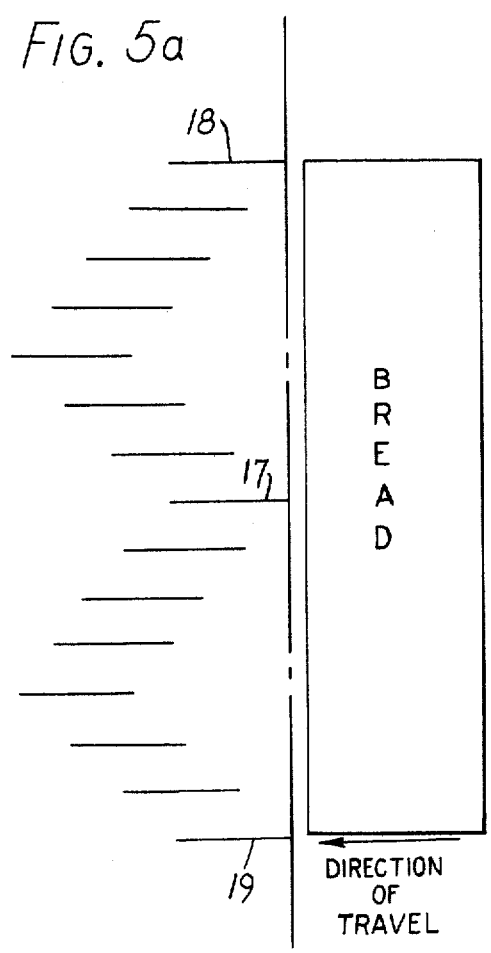
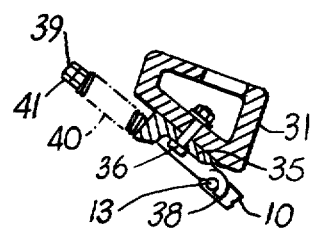
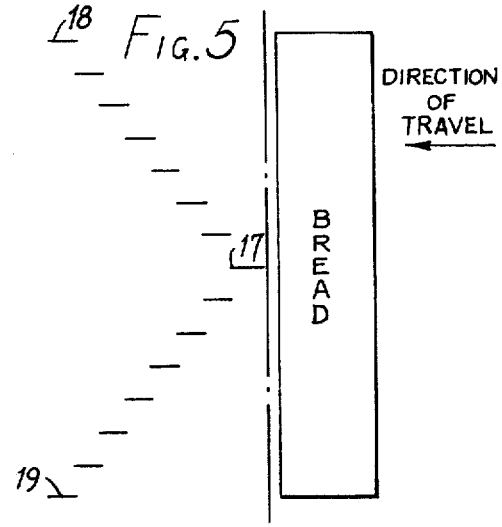
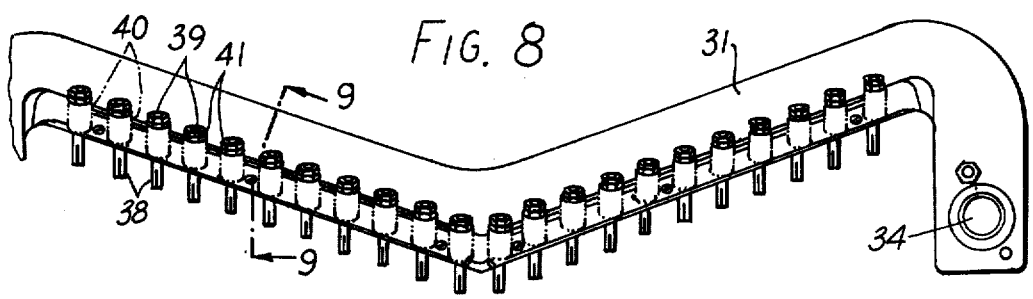

FIG. 6
FIG. 7
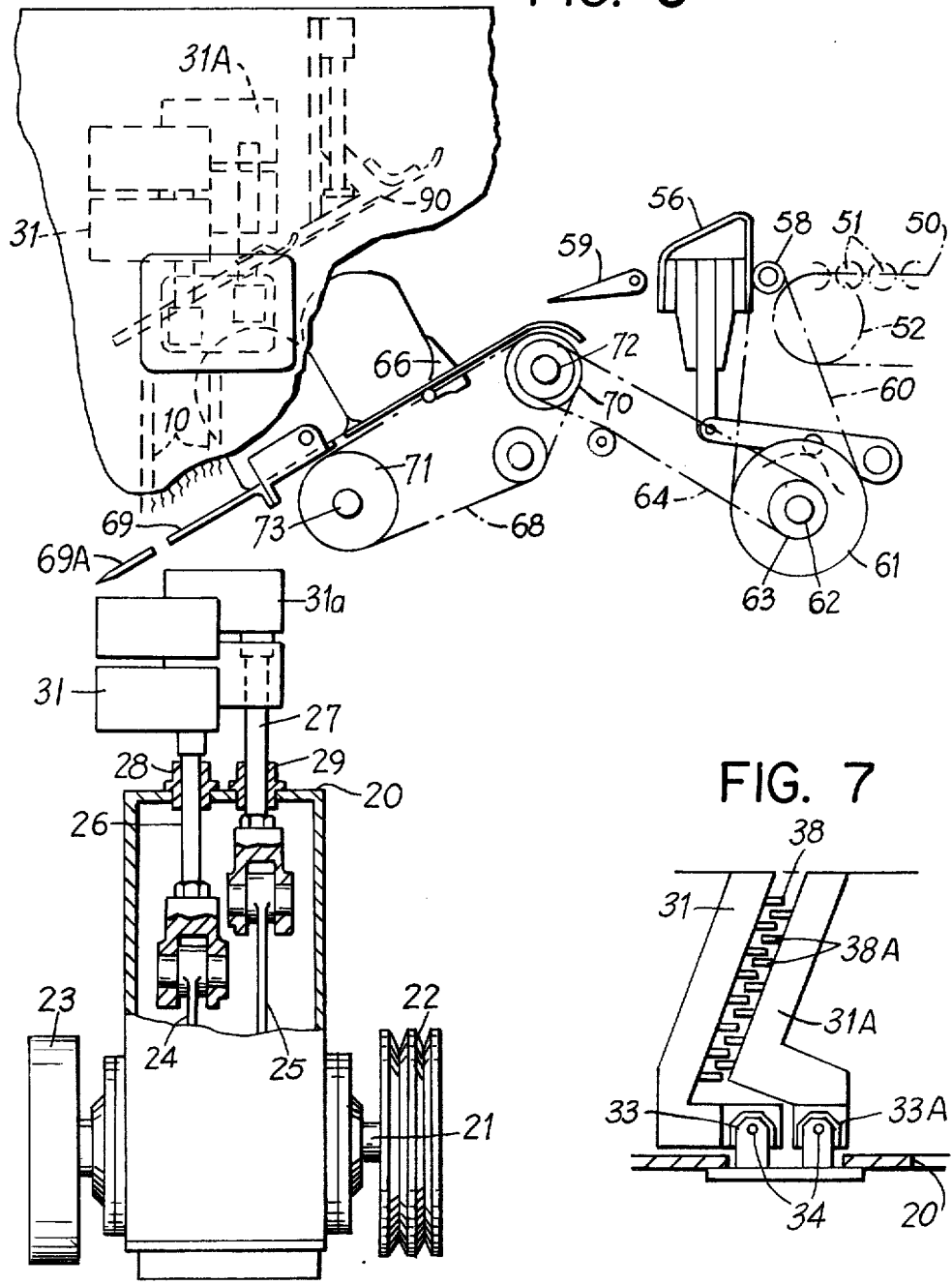
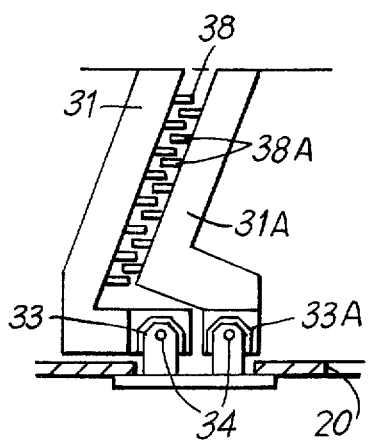

BREAD SLICING MACHINE

The present invention is directed to an improved method and apparatus for slicing loaves of bread. More particularly, the present invention is directed to an arrangement employing a plurality of slicing knives disposed in a manner to rapidly and efficiently pass through a bread loaf in cooperating opposite directions. In this connection, the invention employs two generally V-shaped frames which reciprocate in opposite directions, such as, when one blade is moving in one direction, the adjacent blade or blades move in still another direction.

Prior art machines employing V-shape blade configurations, have exhibited a number of operational shortcomings. In this regard, the ability to provide a clean slice without crushing and/or cutting the crust in a ragged fashion, as well as, crushing of the loaf interior and distortion of the bread texture during slicing, is quite commonplace. Furthermore, the need to replace and sharpen blades which became worn has presented an expensive problem in terms of replacement costs and lost production time.

The prior art while recognizing this problem, has however, not overcome the aforementioned difficulties by combination of cutting blade configuration, as well as, loaf presentation with respect to the cutting blades.

The principle features of the present invention include in a slicing machine having a plurality of cooperating frames in adjacent planes parallel to each other, said frames having a wide V shape of from 10° to 30° with each of said frames having a series of projections facing in opposite directions toward each other for mounting and supporting said cutting blades in similar V formation, wherein: said cutting blades being adapted to run through the product to be sliced in opposite directions, said blades being in cooperative working relation such that a part of constant thickness of one blade overlaps the corresponding width of an adjacent blade an amount equal to 20 to 80 percent of said width to thereby define a cutting zone; and guide means for urging the article to be sliced into the cutting zone at an angle with respect to said reciprocating frames and cause said cutting blades to engage said article at a corner thereof for initiating the cutting operation.

Also within the scope of the invention is a method of slicing a loaf of bread including the steps of: advancing a plurality of loaves on a conveyor at an angle with respect to a plurality of slicing blades disposed in overlapping adjacent relation with respect to one another being mounted on a pair of V-shaped frames; engaging the loaf with the apex of the V blade array at one corner of said loaf; urging said loaf to engage said slicing blades enabling the action of said overlapping blade surfaces to guide the slices being cut by the reciprocating action of said blades; and means for guiding the completely sliced loaf away from cutting blades.

Accordingly, it is the object of the present invention to provide a method and a apparatus for over-coming the short-comings of the prior art.

Still another object of the present invention is to provide an apparatus having a mode of operation to assure constant, uniform and rapid slicing of bread loaves being conveyed to such cutting station.

It is still a further object of the present invention to provide a cutting knife configuration which will minimize the build-up of frictional heat and minimize the associated build-up of gluten to provide for a clean cut during operation.

Still a further object of the present invention is to provide a method by which the loaf to be cut is advanced into the cutting station such that the blade action on the loaf produces a stroke simulating that of natural hand slicing.

Other objects and advantages of the present invention will be more fully understood with respect to the appended specification and claims explaining and defining the invention as set forth in the drawings.

In the drawings:

FIG. 1 is an elevational view of a normal type of reciprocatory knife blade;

FIGS. 2 and 3 show cross-sectional views of adjacent blades;

FIG. 4 shows a cross-sectional view of adjacent blades arranged in accordance with the present invention;

FIG. 5 shows an arrangement of blades in accordance with the invention;

FIG. 5a shows a variation of an arrangement of blades in accordance with the invention, FIG. 6 shows a side elevational view of a bread slicing machine made in accordance with the invention;

FIG. 7 is a half plan view of part of FIG. 6 taken along plane 7—7,

FIG. 8 is a plan view of the rear frame carrying knife blades;

FIG. 9 is a sectional view on the line 9—9 on FIG. 8;

Figure 10:
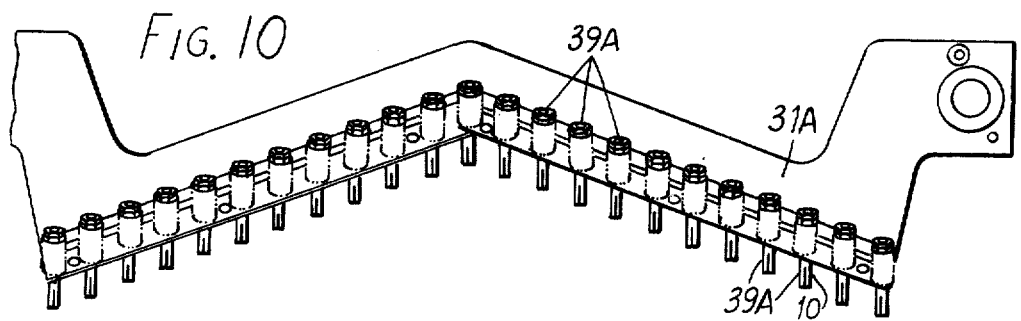
FIG. 10 is a plan view of the front frame carrying the knife blades.

The blade shown in FIG. 1 is of normal construction as used for the present invention. It consists of a flat straight steel blade 10 about 10 to 25 thousandths of an inch thick formed with scallops 11 sharpened at 12 so that the full thickness of the blade extends over the width D. The ends of the blades are made with pins 13 to engage in hooks on the reciprocating frames of the machine. In machines already in use the blades are in alignment as shown in FIG. 2 and produce a slice of thickness A. It will be apparent that this slice has been compressed during its passage through the blades to a thickness of the blades in the bread. This compression will occur in every part of the slice and at any instant it is compressed over a width D. This compression increases the rubbing friction on the blades with consequent increase of temperature of the blades and bread.

It has been suggested to provide a machine in which the blades in plan form a V-shape such that no overlap occurs in the width D of one blade compared with the adjacent blades as shown in FIG. 3. It would seem that such offset blades would cause violent up and down juddering movements of the bread leading to misshapen loaves, crumbling, variation of thickness of the slices and other defects.

Tests have indicated that as the cutting blade temperature increases, there is a tendency for an increase in the rate of accumulation of adverse deposits, such as gluten build-up. When this occurs to any significant degree, the power required to slice also adversely affects the surface appearance of the loaf being cut by the blades. To reduce the temperature of the slicing blades, and thereby avoid such deleterious build-up, serious consideration must be given to arrange the blades permitting adjacent blades to be in a staggered relationship with one another. Furthermore, in actual operation, one often finds that the slices are relatively weak in structural strength and that during the cutting operation the sidewalls of the loaf tends to collapse from its normal shape to a form closely appearing a "keyhole" or "S" shape.

These characteristics are detrimental to the physical appearance of the loaf and the further apart the blades are staggered, the more pronounced becomes the collapse, especially when slicing "soft" breads.

Up to the present time, the degree of slicer blade overlap to attain an optimized relationship with the composition and structure of the bread loaf itself, has not been fully explored.

Proper blade placement tends to reduce temperature of the blade and of the blade slice surface so as to overcome the resistance of the loaf being sliced.

The present invention employs blades arranged so that the width D of one blade of constant thickness (which exludes the width that carries the chamfers forming the cutting edge) overlaps the width D of the adjacent blade from 20 to 80 percent of the width D. Thus as shown in FIG. 4, the width D of one blade overlaps the width D of the adjacent blade at a distance E which is about 50 percent of width D. With this configuration, a zone of slice compression exists but this is much less than in the arrangement of FIG. 2 but sufficient to control the vertical movements of the bread because the upward force of one blade is counteracted in the compression zone by the downward force of the adjacent blades. The friction between the blades and the bread is reduced and the bread held steady so high bread throughput rates are attained without crushing.

The blades are arranged in a V-shaped plan formation with the central blade being the first to enter the loaf (See FIG. 5) or if desired, the blades may be arranged in two or more V-shapes (FIG. 5a) or even in a single inclined line (not shown). Further, if desired, the foremost knives of the V-shapes may be arranged to move in opposite directions by making the limbs of the V differ by one or three blades. For example, one side of the V may have one more blade than the other side as shown in FIG. 5a, whereby when blade 17 is moving up, the blades 18, 19 are moving down. The frames have the same or almost the same number of knives as each other.

The machine is provided with a suitable frame 20 (FIG. 6) in the lower part of which are bearings for a crankshaft 21 which carries a wheel 22 driven by any available source of power. The crankshaft also carries a flywheel 23. The crankshaft drives two crank rods 24, 25 which reciprocate two rods 26, 27 mounted in vertical bearings 28, 29. The upper ends of the rods 26, 27 enter central vertical holes in vertical knife blade frames 31, 31A. These frames reciprocate in adjacent planes parallel to each other and are similar to each other although not identical. The same references with the addition of the letter A are used for the front frame in FIG. 10 as are used for the rear frame in FIGS. 8 and 9. Referring to FIGS. 8 and 9, the frame is approximately rectangular in shape and its sides are of U-shape cross-section holding bearings which slide on guide rods 34 of the frame. These U-shaped parts are arranged in line with each other so that the rods 34 are also in a plane on each side parallel with the cutting direction, i.e. parallel with the planes of the blades. The upper bar of the frame carries a series of brackets 35 attached thereto by bolts 36 (See FIG. 9). These brackets carry projections in the form of hooks 38 having threaded stems 39 urged by springs 40 held by nuts 41 on the stems. The studs 13 at the top end of the knife blades 10 engage in the hooks 38 and the bottom studs engage similar hooks along the bottom bars of the frames.

The frames are a wide V-shape in plan view and their hooks project in opposite directions towards each other (FIG. 7) being arranged so that the hooks and blades of one frame are interleaved with those of the other frame. The angle of V-shape of the frames are all selected to cause the overlapping to the extent hereinbefore described for the required geometry of the blades and slice thickness.

An essential feature of the present invention concerns itself with the ability of the knives while actively engaged in cutting the loaf being advanced therethrough, to simultaneously provide sufficient surface contact with the slice being formed to thereby guide such slices. This feature will be detailed hereinafter insofar as it relates to the degree of overlap of the blades in combination with the angle of attack on the bread loaf, i.e., the presentation of one corner, preferably a top corner of the loaf to the cutting edges of the blades. Up to the present invention, a typical V slicer operation envisioned relation of the blade with the spacing to the apex angle of the V such that the cutting was to be accomplished singularly or in pairs with the loaf disposed normal to the cutting blades. As a consequence, defects in product quality were commonplace.

As part of this overall inventive concept, the loaf is advanced at an angle to the cutting blade whereby either the top corner or the bottom corner of the loaf is penetrated by the slicer blades prior to the remainder of the loaf surface contacting the blades. This tends to produce the necessary guidance and overcomes the inherent "keyhole" or "S" tendency closely identified with other commercially available slicers.

A series of conveyers are provided at an angle leading down to the cutting blades to carry out correct infeeding. The loaves are placed on a first endless conveyer consisting of chains 50, carrying rollers 51 and mounted on wheels 52 (FIG. 6). The loaves locate successively against a vertically reciprocating gate 56 which allows such loaves to ultimately pass in timed relation to a wrapping machine (not shown) but which receives loaves from the slicing machine and wraps them. The loaves are moved by the action of transfer roller 58 and reciprocating gate 56, 59. The roller 58 is driven by chain 60 and wheel 61 on shaft 62 and the latter is driven by wheel 63 and chain 64. The loaf is grabbed off the fingers by one of a number of crossbars 66 carried by conveyer 68 on wheels 70, 71 on shafts 72, 73 driven from the main drive. The cross-bar 66 pushes the loaf in a straight plane on support plates 69, 69A and the loaves preceeding through the reciprocating knife blades. The sliced loaves are received individually on a slatted board over which travel cross-bar flights convey the loaves away maintaining its synchronism to the wrapping machine.

The loaves are held down by a vertically adjustable guide plate 90 which is positionable upon the loaves in accordance with their height.

The degree of overlap of the blades depends somewhat on the spacing apart of the blades, i.e. on the thickness of slices to be cut. In general, the percentage of overlap will increase with blade width and with diminution of slice thickness. The plan angle of the frames, may be different for each blade width and/or slice thickness. Normally an angle of 10° to 30° is suitable. It is even possible to use one angle e.g. 20° for all thicknesses of slices from 0.25 inch up to the maximum slice thickness.

Figure 14:
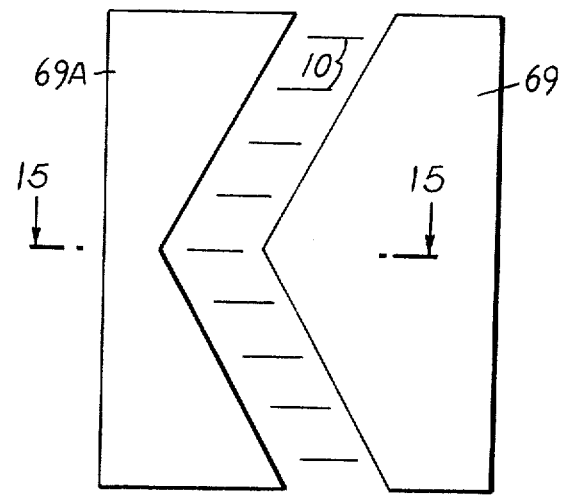
FIG. 14 is a plan view of the knives and bread support plates.
Figure 15:
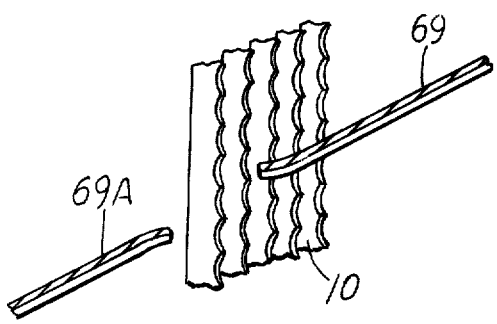
FIG. 15 is a sectional view on the plane 15—15 on FIG. 14.

The loaf support plates 69, 69A are shown in FIGS. 6, 14 and 15 do not have comb-like fingers projecting between the blades 10. Such comb-like fingers are normally required in slicing machines and a different size comb is needed for each slice size. These combs are a considerable source of trouble because they become filled with crumbs and need cleaning and wedging of crumbs causes bent teeth. The combs also complicate frame changes. With the present arrangement comb-like support plates are not required. The reason for this is that with V-shaped support plates 69, 69A having their V-edges spaced apart say 0.75 inch this gap can be tolerated because slicing occurs gradually so that the unsliced part of the loaf supports the sliced portions.

Figure 13:
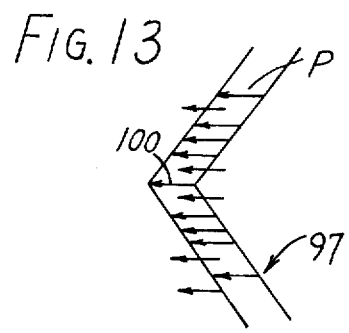
FIGS. 11, 12 and 13 show the application of the invention to endless blades, FIG. 13 being a sectional view on the plane 13—13 on FIG. 12.
Figure 11:
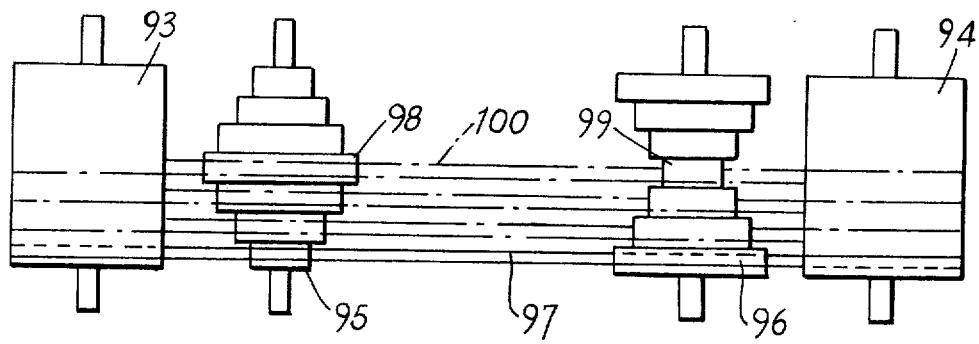
Figure 12:
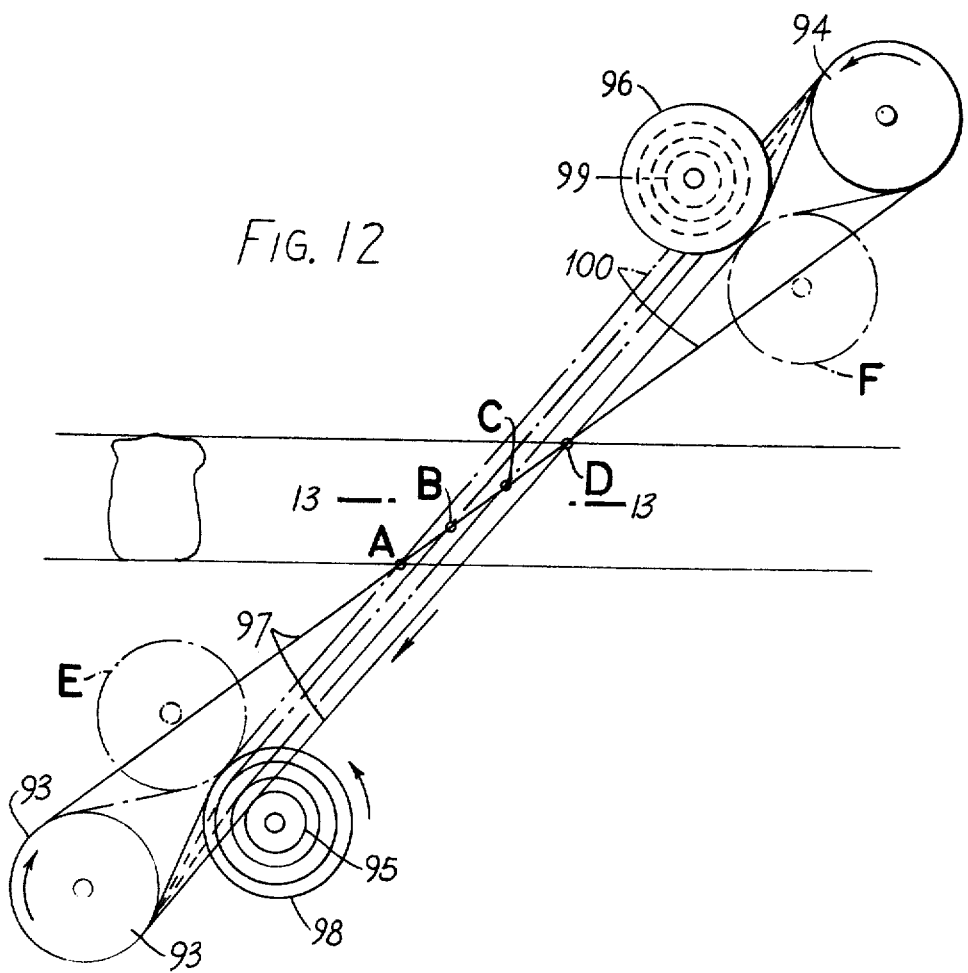

In applying the inventive concept to endless blade knives, the blades may run over jockey wheels or drums of different diameters e.g. a pair of jockey drums for each blade in addition to the main drums — as shown in FIGS. 11, 12 and 13. FIG. 11 shows a plan view and FIG. 12 is a side elevation thereof. Two main drums are shown at 93, 94 and a pair of jockey wheels 95, 96 for a knife 97 and a pair of jockey wheels 98, 99 for a blade 100. This provides four runs of the two blades and of course any required number may be provided. The jocket wheels on each axis may be separate or merely different diameters on an integral drum.

This arrangement provides a V-arrangement of the downward runs of the blades and also displaces the crossing points throughout the height of the loaf. Each blade runs over a small and a large jockey wheel so that the blades have the same blade length.

FIG. 13 is a cross-section taken in line 13—13 of FIG. 12, through the central line of the bread and shows that only the downward running part of the band P and every other alternate blade is deflected to form a V arrangement, while the upward running part of the band remains undeflected. This also displaces the crossing points of the individual blades from center of the positions marked A, B, C, D in FIG. 12. Thus there is no crowding of the bread at any one point in its passage through the blades.

It is, of course, possible to use another pair of deflecting jockey drums (shown at E, F) in which case both up and down running blades would be deflected into the V arrangements.

Thus the V arrangement of the cutting blades is obtained on band slicers by deflecting pulleys, which with the proper amount of stepping from minimum to maximum does not require varying blade lengths.

While this invention has been described in detail with particular reference to preferred embodiments thereof, it will be understood that variations and modifications can be effected within the spirit and scope of the invention as described hereinbefore and as defined in the appended claims.

What I claim is:

1. In a slicing machine having a plurality of cooperating cutting blades mounted on two oppositely reciprocating frames in adjacent planes parallel to each other, said frames having a wide V shape of from 10° to 30° with each of said frames having a series of projections facing in opposite directions toward each other for mounting and supporting said cutting blades in similar V formation, wherein: said cutting blades being adapted to run through the product to be sliced in opposite directions, said blades being in cooperative working relation such that a part of constant thickness of one blade overlaps the corresponding width of an adjacent blade an amount equal to 20 to 80 percent of said width to thereby define a cutting zone; and guide means for urging the article to be sliced into the cutting zone at an angle with respect to said reciprocating frames and cause said cutting blades to engage said article at a corner thereof for initiating the cutting operation.

2. A slicing machine as claimed in claim 1 wherein: said support means are arranged to support said cutting blades to meet the product in at least two V-shapes, the limbs of the V differing in numbers of blades by one or three.

3. A slicing machine as claimed in claim 1 wherein: said frames have vertical guide bearings movable on axes that are in a plane on each side parallel with the planes of the blades.

4. A slicing machine as claimed in claim 1 wherein: the article to be cut is urged through said cutting blades by cross-bars moving in a flat plane on a pair of conveyer chains and the sliced articles are received on a board and moved away by cross-bar flights carried by another pair of conveyer chains.

5. Method of slicing a loaf of bread including the steps of: advancing a plurality of loaves on a conveyer at an angle with respect to a plurality of slicing blades disposed in overlapping adjacent relation with respect to one another being mounted on a pair of V shaped frames; engaging the loaf with the apex of the V blade array at one corner of said loaf; urging said loaf to engage said plurality of overlapped slicing blades whereby said blades being overlapped with respect to one another by an amount equal to of from 20–80 percent of the width of such blades, enabling the action of said overlapping blade surfaces to guide the slices being cut by the reciprocating action of said blades; and guiding the completely sliced loaf away from cutting blades.

6. A method of slicing a loaf of bread as claimed in claim 5, including the steps of: urging the top corner of said loaf of bread at an angle with respect to the cutting edges of said plurality of vertically reciprocating adjacent blades.

* * * * *